United States Patent [19]

Atman

[11] 4,013,211
[45] Mar. 22, 1977

[54] METHOD OF FORMING A CLAD WIRE

[76] Inventor: Jay W. Atman, 401 Manordale Road, Pittsburgh, Pa. 15241

[22] Filed: Apr. 5, 1976

[21] Appl. No.: 673,795

[52] U.S. Cl. .............................................. 228/126
[51] Int. Cl.² ......................................... B23P 3/14
[58] Field of Search ................... 228/126, 134, 130

[56] References Cited
UNITED STATES PATENTS

| | | | |
|---|---|---|---|
| 2,100,258 | 11/1937 | Larson | 228/126 |
| 2,108,528 | 2/1938 | Cykajlo | 228/126 |
| 3,408,727 | 11/1968 | Dion | 228/130 |
| 3,565,677 | 2/1971 | Dion | 427/431 |
| 3,600,790 | 8/1969 | Dion | 228/130 |

*Primary Examiner*—Harold D. Whitehead
*Attorney, Agent, or Firm*—Wegner, Stellman, McCord, Wiles & Wood

[57] ABSTRACT

A clad wire having a cast metal core with a formed sheath intimately bonded to the core with the interface portions thereof being effectively free of intermetallic compounds. The clad product may be formed by the steps of forming a strip of first metal into a closed tube, introducing a fused second metal into the tube from a position upstream of the tube and causing the fused second metal to quickly solidify within the tube while effectively causing a separation of the tube and core interface portions for a sufficient short period of time to permit the core temperature to drop below the temperature at which intermetallic compounds of the core and sheath tube material readily form.

23 Claims, 3 Drawing Figures

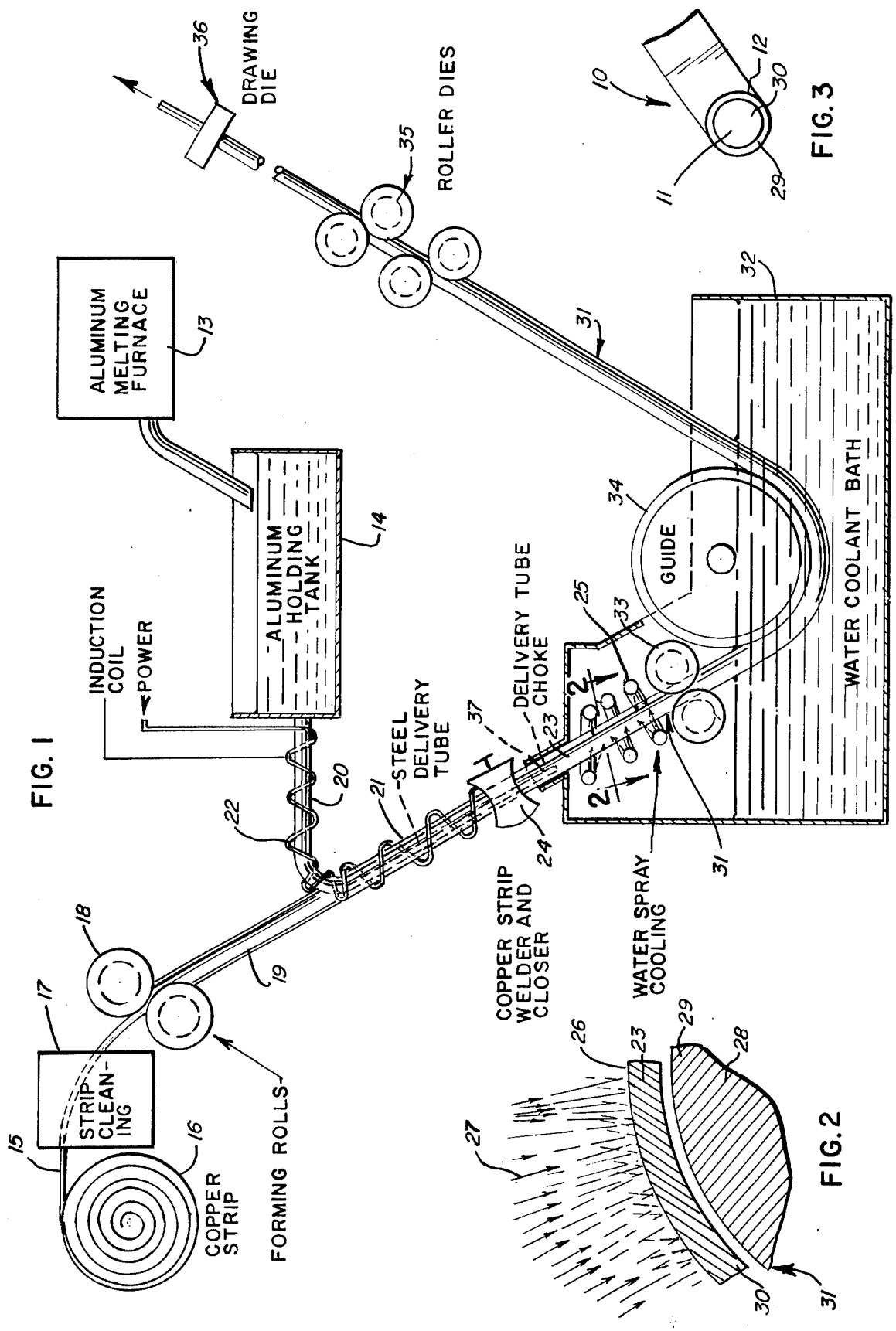

METHOD OF FORMING A CLAD WIRE

BACKGROUND OF THE INVENTION

1. Field of the Invention

This invention relates to cladding of elongated metal elements.

2. Description of the Prior Art

One commercially common form of elongated clad metal product comprises copper clad aluminum wire, or rod. One conventional use of such clad wire is as coaxial cable core wire wherein the high frequency signal is carried by the thin clad copper coating and low frequency power current is carried by the entire wire. Another example of such conventional clad wire usage is in conventional construction power wiring where the coating may be formed of copper to provide good connectability and where the core may be formed of aluminum to provide relatively low cost. General specifications have been promulgated by ASTM for such products having both 10% and 15% cooper-to-aluminum ratios by volume, with the aluminum comprising an EC grade aluminum.

Different methods have been conventionally employed for producing such clad wire theretofore. In such methods, strips of copper of semitubular shape are placed about an aluminum rod. The composite is then heated with the edges of the copper strips being pressure welded in a suitable roll and with the excess copper being shaved off upon completion of the pressure welding operation. The composite rod is then drawn to a final desired diameter. This method permits the temperature of the metals to be maintained below the temperature in which intermetallic compound formation normally occurs, and more specifically, with aluminum and copper as the metals of the clad wire, the temperature is maintained below approximately 500° F. One advantage of this process is the ability to utilize different alloys of copper and aluminum as desired in the final product, and one disadvantage of the method is the requirement of a relatively large copper-to-aluminum ratio.

Another disadvantage is the requirement of relatively close tolerances to assure proper copper welds, and effectively prevent aluminum "showthrough" and poor surface quality.

Another process conventionally utilized in forming such clad wire utilizes a cleaned aluminum rod which is continuously delivered into a copper tube which is formed from copper strips and welded by an inert gas shielded arc. The weld is scarfed and the tube is subsequently reduced in diameter to the size of the aluminum rod in a suitable rolling die. A subsequent approximate 80% reduction is effected by drawing steps requiring the use of relatively low yield strength aluminum rod.

A further conventional process for forming clad wire utilizes coextrusion of both the core material and the sheath material. The process is effected by a hydrostatic press wherein aluminum ingot is extruded into a formed copper tube with the core and sheath portions being bonded together as they extrude through the die opening at relatively low temperatures. This process has the disadvantage of being discontinuous and relatively expensive relative to the high cost of material preparation and low material recovery.

Still another process utilized conventionally for forming clad wire comprises an electroplating process wherein copper is plated on aluminum core material in a continuous method. A problem in this method arises from the use of tin, zinc, or similar metals in the plating substrates which promotes diffusion and brittle intermetallic layers at the copper annealing temperatures, thereby preventing annealing of the plated rod. Alternatively, the core material may be plated at more near the final desired size of the clad wire. This approach has the serious disadvantage of requiring relatively expensive plating equipment presenting serious control problems. One problem attendant the use of plating processes is the forming of nodules in the plating which may create "noise" where the wire is to be used for coaxial purposes.

Still another proposed method of forming such clad wire utilizes aluminum rod and copper tubing formed into spirals which are threaded together and drawn down to the desired final size.

Illustrative of the prior art utilizing aluminum rods covered with thin sheets of copper which are welded about the rod are the U.S. Pat. Nos. 3,600,790 and 3,565,677 of Paul A. Dion et al, and 3,408,727 of Paul A. Dion.

SUMMARY OF THE INVENTION

The present invention comprehends a method of forming an improved clad wire wherein a strip of a first metal is progressively endwise formed and longitudinally welded into a circumferentially closed tube, fused second metal is introduced into the tube from a position upstream of the tube closure, and a reduced contact pressure between the tube and the core metal is effected while concurrently quickly solidifying the core metal to effectively preclude the formation of intermetallic compounds at the interface portions of the core and sheath tube metals.

The invention contemplates the rapid cooling of the core within the tube by suitable means such as liquid spray and liquid bath means.

In the present invention, the fused core material is caused to solidify by heat transfer through the outer sheath tube. As the tube material may have a lower coefficient of expansion than that of the core material, this cooling action effects a desirable effective stress acting in the direction of separation of the interface portions of the core and tube to provide the desirable minimum formation of intermetallic compounds thereat.

In the illustrative embodiment, the core material is brought to below the preselected temperature at which the interface portions have a high rate of intermetallic compound formation within approximately one-half second or less.

Upon cooling of the core and tube material to reduce the temperature of the interface portions to below the preselected temperature, constrictive forming of the clad wire may be effected as by rolling and drawing operations.

The present invention comprehends the forming of such a clad wire having a ratio by volume of the sheath material to the core material of less than approximately 12% and in the illustrated embodiment, of approximately 5%.

In the illustrated embodiment, the cooling liquid is water.

By effectively minimizing the intermetallic compounds in the interface portions of the core and sheath in the final clad wire, an improved clad wire structure is obtained having improved ductility and uniformity and permitting facilitated reduction to final desired size by conventional drawing processes.

The clad wire product and the method of forming the same are extremely simple and economical while yet providing the highly desirable features discussed above.

BRIEF DESCRIPTION OF THE DRAWING

Other features and advantages of the invention will be apparent from the following description taken in connection with the accompanying drawing wherein:

FIG. 1 is a schematic elevation of an apparatus for forming clad wire embodying the invention;

FIG. 2 is a fragmentary enlarged section taken substantially along the line 2—2 of FIG. 1; and FIG. 3 is a fragmentary perspective view of clad wire embodying the invention.

DESCRIPTION OF THE PREFERRED EMBODIMENT

In the exemplary embodiment of the invention as disclosed in the drawing, a clad elongated metal product generally designated 10 is shown to comprise a clad wire, or rod, having a core 11 and a tubular sheath 12. The core material comprises a metal having a melting temperature lower than that of the metallic sheath tube material, and in the illustrated embodiment, the core is formed of aluminum and the sheath is formed of copper. As will be obvious to those skilled in the art, the invention contemplates the utilization of any suitable desired combination of materials for the core and sheath tube, respectively.

Broadly, the invention contemplates forming the clad element 10 by solidifying fused, or molten, core material directly within the sheath tube by a rapid cooling thereof so as to effectively preclude substantial formation of intermetallic compounds in the interface portions of the core and sheath tube.

More specifically, as shown in FIG. 1, the core material may comprise fused aluminum delivered from a melting furnace 13 to a holding tank 14. The sheath may be formed from a copper strip 15 supplied from a suitable roll 16 and surface cleaned in a conventional strip cleaning apparatus 17.

Strip 15 may be delivered through suitable forming rolls 18 to partially form the strip into a partial tubular configuration 19. The fused aluminum is delivered through the partially closed portion 19 by means of a steel delivery tube 20 having a delivery portion 21 coaxial with the partial tubular formation 19. The delivery tube may be provided with a heating wire 22 adapted to maintain the aluminum therein at a preselected fused temperature for delivery from a distal end portion 37 of the steel tube into the fully formed tube 23 produced by a conventional apparatus 24 for closing the partially formed tubular configuration 19 and effecting a welding of the juxtaposed edges thereof.

In the illustrated embodiment, the distal end of the delivery tube 20 has an outer diameter less than the inner diameter of the fully closed and welded sheath tube 23 by no greater than twice the thickness of the sheath tube strip material, i.e., the wall thickness of the formed tube 23. Thus, the resultant small clearance acts as a choke preventing flow of the molten aluminum material back outwardly from the fully formed tube 23 to the partial tubular configuration 19.

Substantially immediately upon delivery of the molten aluminum into the formed tube 23, the aluminum and copper material are cooled as by delivering of suitable liquid spray from a conventional spray cooling apparatus 25 against the outer surface of the sheath tube as best seen in FIG. 2. Thus, as shown therein, outer surface 26 of the sheath tube 23 is engaged by the spray liquid 27 to effectively cool both the core 28 of solidifying fused aluminum and the sheath tube 26. As the core material has a higher coefficient of thermal expansion than the sheath material, the core is effectively independent of the sheath tube at the outer interfacial portion 29 of the core and the inner interfacial portion 30 of the sheath tube so as to effectively minimize formation of intermetallic compounds in the interfacial portions 29 and 30. Concurrently, the cooling of the core and sheath tube is rapidly effected so as to lower the temperature of the core material 28 to below the preselected temperature at which substantial formation of intermetallic compounds occurs. Thus, where the core material is aluminum and the sheath tube is copper, the cooling operation is effected to lower the temperature within less than one second, and in the illustrated embodiment, less than one-half second, to below 500° F.

To further assure such rapid temperature depression, the tube and core assembly generally designated 31 is delivered downwardly into a water coolant bath 32 through a pair of roller dies 33 and a guide 34.

The core and sheath tube assembly 31 is then passed through a plurality of additional roller dies 35 constrictively reducing the cross section of the assembly suitably for subsequent drawing thereof in conventional drawing die means generally designated 36 so as to provide a final clad wire of a preselected desired cross section, as shown in FIG. 3.

As indicated above, in the illustrative embodiment of the invention, the clad wire 10 comprises a copper clad aluminum wire. Thus, the aluminum material may be heated to a temperature of somewhat more than approximately 1220° F. in furnace 13 with the temperature of the fused aluminum being maintained in the steel delivery tube 20 by means of the heater, or induction coil, 22 wrapped thereabout. If desired, an inert gas, such as nitrogen or argon, may be provided as a shield blanket over the molten, or fused, aluminum in the annulus between the delivery and sheath tubes.

Delivery of the molten aluminum through the distal end of the delivery tube is made to be smooth and blended along flow lines to avoid turbulence for improved formation of the clad structure. As the relationship of the delivery tube end 37 to the inside diameter of the formed copper outer tube effectively defines a choke, the liquid molten aluminum defines a seal preventing introduction of foreign matter to between the interface portions 29 and 30. Further as shown in FIG. 2, the tenedency for the tube to be spaced from the core material effectively minimizes the formation of intermetallic compounds for the short time at which the core is maintained in the tube at the relatively high temperatures at which such intermetallic compounds may readily form.

By immediately cooling the tube and thus the core disposed therein, the temperature of the metals at the interface portions 29 and 30 is quickly brought below the critical temperature. Illustratively, in one preferred form of the invention, the temperature of the aluminum is brought to below the critical temperature in less than approximately one-half second.

During the initial pulling stages, the copper tube portion is at a lower temperature than the core thereby effectively avoiding stress formation. The subsequent constriction by the rolling and drawing operations effectively bonds the sheath tube to the core. As the intermetallic compound formation is effectively minimized, any small particles thereof which may have formed are isolated and surrounded by the copper-aluminum interface portions 29 and 30 thereby assuring suitable ductility for readily providing the final desired wire size.

In one example of clad product utilizing the above discussed method of formation, a 1 inch diameter clad assembly 31 was provided utilizing copper strip having a thickness of 0.010 inch and a weight of 0.179 lbs. per foot, with the aluminum comprising molton EC alloy having a weight of 0.778 lbs. per foot. The formation of the clad wire was such as to cause the assembly 31 to have a travel of 30 feet per minute with the water spray 27 being delivered at approximately 0.175 cu. ft. per minute, and with the final wire 10 being provided at a rate of approximately 1725 lbs. per hr. The copper sheath portion thereof was 4% by volume of the clad wire.

The process lends itself advantageously to providing clad wire having any desired suitable clad thickness by suitable selection of the copper strip thickness. Illustrative examples of the relationship of the copper strip thickness to the percentage of copper area in the final clad wire are shown in the following table:

| Copper Strip Thickness (inches) | % Copper Area In Product |
|---|---|
| .010 | 4 |
| .012 | 5 |
| .015 | 6 1/4 |
| .018 | 7 1/2 |
| .022 | 8 1/2 |

The present invention provides a substantial reduction in the cost of producing such clad wire. The method provides a facilitated process for accurately controlling the specific ratio of the cladding material to the core material in forming such clad wires and the thickness of the cladding may be varied over a wide range as desired.

The process is adapted for continuous operation by the simple expedient of successive connection end-to-end of additional copper strips.

The invention contemplates constricting the tube as by the rollers 33 to provide juxtaposition of tube portion 30 to core portion 29 while the core portion 28 is still at a higher temperature than the tube portion 23. Such constriction together with the constriction effected by the roller dies 35 effectively avoids surface wrinkling and assures good bonding of the clad sheath to the core material in the final product. By forming the core directly in the sheath tube, the use of molds or slip forms is avoided, thereby further reducing the cost of manufacture of the clad wire and simplifying the manufacturing operation.

The foregoing disclosure of specific embodiments is illustrative of the broad inventive concepts comprehended by the invention.

I Claim:

1. A method of forming an elongated clad metal product comprising the steps of:

forming a strip of first metal progressively endwise into a circumferentially closed tube;

introducing fused second metal into the tube from a position upstream of the tube, said second metal having a melting temperature lower than that of said first metal;

causing the fused second metal to quickly solidify within the tube to form a core therein and concurrently cause the tube to pull radially relative to the core; and contracting the tube about the solidified core after the temperature of the core drops below a preselected temperature.

2. The method of forming an elongated clad metal product of claim 1 wherein said fused second metal is caused to solidify by heat transfer to said tube.

3. The method of forming an elongated clad metal product of claim 1 wherein said fused second metal is caused to solidify by heat transfer to said tube, said tube being externally cooled to effect transfer of heat therefrom concurrently with said heat transfer from the core to the tube.

4. The method of forming an elongated clad metal product of claim 1 wherein said fused second metal is caused to solidify by heat transfer to said tube, said tube being contacted with coolant fluid to effect transfer of heat there-from concurrently with said heat transfer from the core to the tube.

5. The method of forming an elongated clad metal product of claim 1 wherein said fused second metal is caused to solidify by heat transfer to said tube, said tube being contacted with coolant fluid to effect transfer of heat therefrom concurrently with said heat transfer from the core to the tube, said tube and solidified core therein being subsequently further cooled by passage through a liquid coolant bath.

6. The method of forming an elongated clad metal product of claim 1 wherein said tube contracting step comprises a step of mechanically constricting the tube about the cooled solidified core.

7. The method of forming an elongated clad metal product of claim 1 wherein said tube contracting step comprises a step of passing the tube with the cooled solidified core thereon through a roller die means.

8. The method of forming an elongated clad metal product of claim 1 wherein said contracting of the tube includes a drawing step.

9. The method of forming an elongated clad metal product of claim 1 wherein said strip is formed into a tubular configuration with juxtaposed longitudinal edges thereof welded together in said forming step.

10. The method of forming an elongated clad metal product of claim 1 wherein said fused second metal is caused to solidify by heat transfer to said tube, said tube being contacted with coolant fluid to effect transfer of heat therefrom concurrently with said heat transfer from the core to the tube, said tube and solidified core therein being subsequently further cooled by passage through a liquid coolant bath while said tube is being constricted about said core.

11. The method of forming an elongated clad metal product of claim 1 wherein said fused second metal is caused to solidify by heat transfer to said tube, said tube being contacted with coolant fluid to effect transfer of heat therefrom concurrently with said heat transfer from the core to the tube, said tube and solidified core therein being subsequently further cooled by passage through a liquid coolant bath while being passed through constricting means for causing said tube to be constricted about said core while the core is hotter than the tube.

12. The method of forming an elongated clad metal product of claim 1 wherein said fused second metal is delivered into the tube substantially free of turbulence.

13. The method of forming an elongated clad metal product of claim 1 wherein the tube with the fused metal therein is contacted by fluid coolant.

14. The method of forming an elongated clad metal product of claim 1 wherein said strip is formed into a tubular configuration with juxtaposed longitudinal edges thereof welded together in said forming step, and said welded tube being further subjected to means for smoothing weld flash formed thereon.

15. The method of forming an elongated clad metal product of claim 1 wherein said fused metal is introduced into the formed tube through a supply tube extending outwardly from the formed tube and adjacent said strip to a supply of said fused second metal.

16. The method of forming an elongated clad metal product of claim 1 wherein said fused metal is introduced into the formed tube through a supply tube extending outwardly from the formed tube and adjacent said strip to a supply of said fused second metal, said supply tube having a distal end within the formed tube having a radial clearance with the formed tube of no greater than twice the wall thickness of the formed tube to define a choke effectively preventing fused metal from passing outwardly between the supply tube and the formed tube.

17. The method of forming an elongated clad metal product of claim 1 wherein said first metal is copper and said second metal is aluminum.

18. The method of forming an elongated clad metal product of claim 1 wherein said second metal has a thermal coefficient of expansion greater than that of said first metal.

19. The method of forming an elongated clad metal product of claim 1 wherein said means for causing said second metal to quickly solidify is arranged to cause the temperature of said second metal to quickly drop below a temperature at which said first and second metals have a high rate of intermetallic compound formation.

20. The method of forming an elongated clad metal product of claim 1 wherein said first metal is copper and said second metal is aluminum, and means for causing said second metal to quickly solidify is arranged to cause the temperature of said second metal to quickly drop below 500° F.

21. The method of forming an elongated clad metal product of claim 1 wherein said first metal is copper and said second metal is aluminum, and means for causing said second metal to quickly solidify is arranged to cause the temperature of said second metal at the inner surface of the tube to drop below 500° F. in less than approximately one-half second.

22. The method of forming an elongated clad metal product of claim 1 wherein said product has a copper-to-aluminum content ratio of less than 12%.

23. The method of forming an elongated clad metal product of claim 1 wherein said product has a copper-to-aluminum content ratio of approximately 5%.

* * * * *